United States Patent [19]

Crowell

[11] 4,304,398
[45] Dec. 8, 1981

[54] DEVICE FOR HOLDING OBJECTS FOR FINGERPRINTING

[76] Inventor: John R. Crowell, 4175 Nabal Dr., La Mesa, Calif. 92041

[21] Appl. No.: 155,110

[22] Filed: Jun. 2, 1980

[51] Int. Cl.³ .......................... B23Q 3/06; B66C 1/54
[52] U.S. Cl. .................................... 269/48.1; 269/95; 248/177; 248/311.3; 294/95; 294/116
[58] Field of Search ................. 294/1 R, 15, 16, 19 R, 294/20, 28, 86 R, 93–97, 99 R, 100, 106, 115, 116; 29/262, 278; 248/311.3, 519–520, 121, 177; 269/2–4, 9, 48.1, 47, 48, 50, 52, 95

[56] References Cited

U.S. PATENT DOCUMENTS

| 57,447 | 8/1866 | Stockmar | 269/6 |
|---|---|---|---|
| 176,737 | 5/1876 | Campbell | 294/116 X |
| 903,071 | 11/1908 | Farnham | 269/52 X |
| 1,030,242 | 6/1912 | Kindstrand | 269/4 |
| 1,235,237 | 7/1917 | Parsons | 294/95 X |
| 1,514,814 | 11/1924 | Allen | 294/20 |
| 3,418,020 | 12/1968 | Brubaker | 294/93 |
| 3,481,641 | 12/1969 | Berger et al. | 294/100 |

FOREIGN PATENT DOCUMENTS 423436  1/1935  United Kingdom ............... 269/4

Primary Examiner—Johnny D. Cherry
Attorney, Agent, or Firm—Ralph S. Branscomb

[57] ABSTRACT

A jig is provided for use in supporting objects from which fingerprints are to be removed or lifted, the operative mechanism comprising a plurality of pivoted arms which can be made to expand or contract to engage a bottle, glass or the like from the inside or the outside, this movement being effected by means of rotating a junction collar to which the arms are pivoted at their inside end about a central shaft, advancing the collar toward or away from a guide disk. A stand is provided into which the shaft is inserted and in which it may be rotated about its longitudinal axis or removed, and a second shaft having a frustoconical stopper on the end may be used in the stand alternatively to the more complicated, expanding-arm structure described above.

3 Claims, 7 Drawing Figures

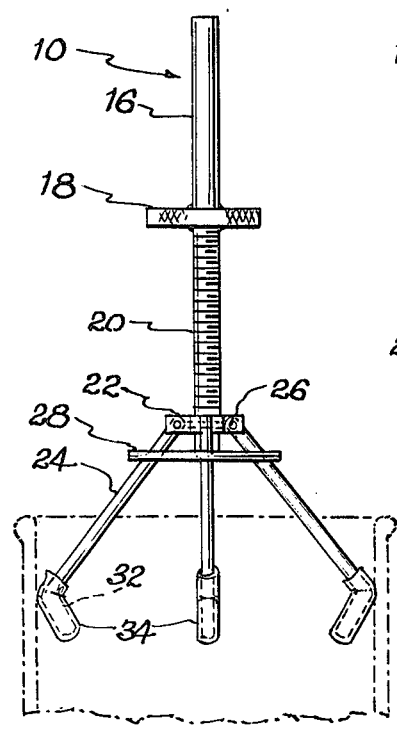
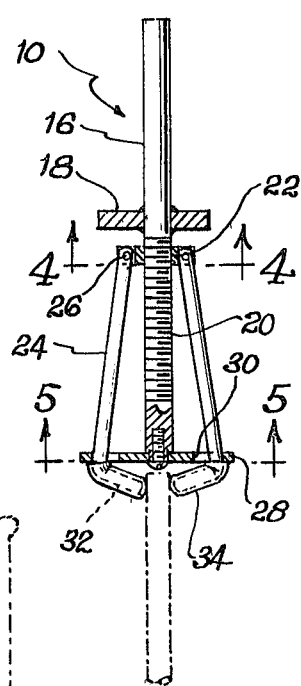
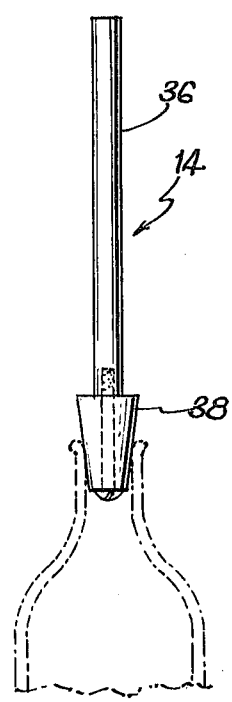
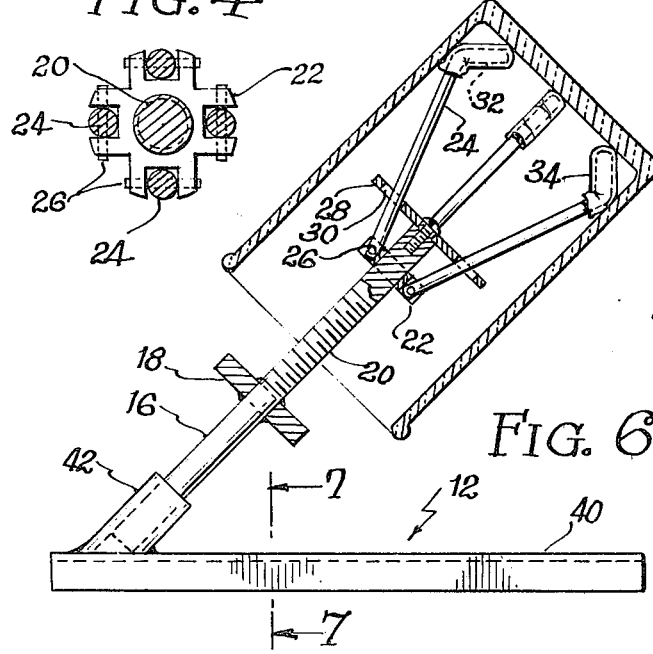
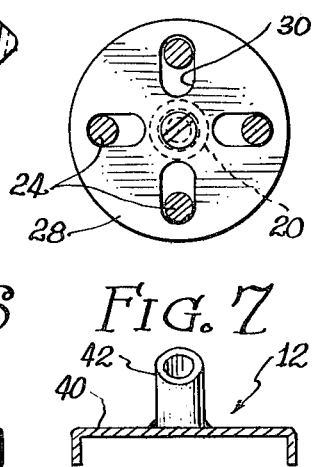
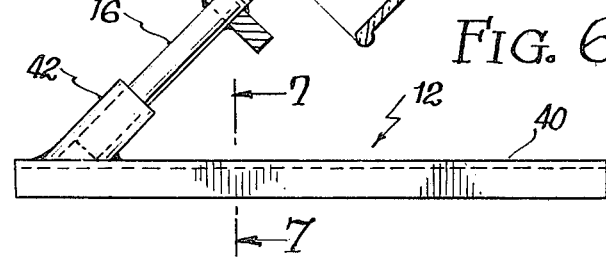
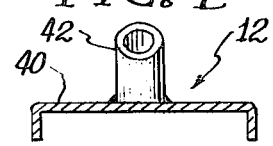

DEVICE FOR HOLDING OBJECTS FOR FINGERPRINTING

BACKGROUND OF THE INVENTION

Very often when examining the site of a crime or gathering evidence in other circumstances it is desirable to remove fingerprints from glasses, bottles and other cylindrical objects thought to have been handled by a suspect. Generally latent prints are found, or to be found, on opposite sides of the object, the thumb being on one side and the fingers on the other. Additionally, normally of course if the object has been handled for a period of time prints will be scattered all over the surface.

It is a real problem for a technician to lift the latent prints from one side without damaging or destroying the latent prints on the other when he exerts the pressure necessary on the print tape to make the lift. Generally the technician is forced to seek help from another person nearby to hold the item while he makes the lift. Alternatively, the technician may pick out the best latents and lay the cylindrical object on its side and hope that the latent prints on the side resting on the table are not damaged or destroyed, which is normally what happens.

There is a real need therefore for a jig or object holding device which will engage and suspend a glass or the like above a table firmly enough to withstand the pressure of the print tape and yet permit rotation of the object, enabling the technician to remove prints from all sides without damaging any of them.

SUMMARY OF THE INVENTION

The present invention fulfills the above-stated objectives and utilizes a set of expanding arms pivoted at their inner end to a junction collar which is threadably engaged on a shaft along which it axially advances as it is rotated. Toward the expanding end of the arms there is a guide member having holes loosely receding and guiding the arms in sliding relation, so that as the guide, junction collar, and arms are together maintained stationary with the central shaft rotated, the arms either expand or contract to grip a glass or bottle from the inside or on the outside as the case may be.

Once thus engaged, a sturdy stand is utilized having an angulated upwardly directed socket into which the end of the gripper shaft is inserted while the specimen is being printed and examined. This socket also will seat the shaft of an alternative component of the apparatus having a frustoconical, elastomeric plug on the end to engage a narrow-necked bottle which is too small for the arms of the aforementioned device to penetrate.

BRIEF DESCRIPTION OF THE DRAWINGS

FIG. 1 is a side elevation view of the gripper shown in a glass in phantom;

FIG. 2 is a side elevation view of the gripper shown fully contracted gripping the outside diameter of a specimen in phantom;

FIG. 3 is a side elevation view of the second gripper used with the apparatus having the elastomeric plug on the end and gripping a bottle in phantom;

FIG. 4 is a section taken along line 4—4 of FIG. 2;

FIG. 5 is a section taken along line 5—5 of FIG. 2;

FIG. 6 is a side elevation, partially in section, showing the gripper installed in its base and having a specimen thereof;

FIG. 7 is a section taken along line 7—7 of FIG. 6.

DETAILED DESCRIPTION OF THE PREFERRED EMBODIMENT

The apparatus comprises three basic parts, an expanding arm gripper 10, a base 12 and a bottle gripper 14. The expanding arm gripper is the general purpose gripping jig of the apparatus and is used to engage jars and bottles having large interior diameters and open mouths, and for engaging bottles and the like by their outside diameters, this portion of the apparatus having this dual function.

The gripper utilizes an central shaft 16 to which is soldered or otherwise rigidly fixed a torque disk 18 with a narrow circumference. Just beneath this disk in the orientation displayed in FIGS. 1 and 2 is a threaded portion 20 on which a junction collar 22 is threadedly engaged. This collar is shown best in FIG. 4 where it can be seen that the junction collar pivotally engages the inner ends of the arms 24 with pins 26.

At the bottom of the shaft in its orientation of FIGS. 1 and 2 is a rotably mounted guide disk 28 having elongated slotted appertures 30 best seen in FIG. 5 through which pass the arms 24. At the end of the arms 24 are crooked feet 32 covered with elastomeric boots 34 to provide a frictional, non-abrasive surface.

It can thus be seen from examining FIGS. 1 and 2 that as the central shft is rotated and the mechanism comprising the junction collar, arms, and guide disk is maintained stationary, an axial movement of the junction collar along the shaft will take place, the direction obviously depending on the direction of twist. If, as in FIG. 1, it is desired to grip a jar from the inside, the collar would be made to move downwardly until it engages the inside surface of the jar, and then sufficient gripping force would be provided by twisting the torque disk 18, which of course serves the purpose of giving the operator added mechanical advantage over the expanding arms.

If it is desired to grip an object from the outside diameter as shown in FIG. 2, naturally the arms are first expanded as shown in FIG. 1 and then contracted by counter rotating the shaft. The design of the apparatus as shown is capable of engaging object having inside diameters between 1 1/2 and 4 1/2 inches and having outside diameters from ½ inch to 3 5/8 inches.

The above stated range is adequate for most object which would be used in the apparatus except for those having narrow necks which are desired to be gripped from the inside but being prohibitively small for the insertion of the gripping arms. For bottles of this type a third piece of apparatus, the bottle gripper 14, is provided having a second type of shaft 36 which is simply a straight length, with a resilient frustoconical plug 38 screwed on the end which is inserted into a bottle as shown in FIG. 3.

Both the grippers 10 and 14 can be supported in a base member 12 having a broad-base flat panel 40 with an integral, angulated upright socket 42 which receives the shafts of either of the grippers 10 or 14 in the manner shown in FIG. 6. Note that the cylindrical shafts and the cylindrical socket permit the rotation of the bottle or jar once it is in the position indicated in FIG. 6 so that the prints may be removed from all sides without at any point requiring the object to be laid against the surface.

Thus the device as shown is universally applicable to small, cylindrical objects that are still prevalent on the scene of a crime as being likely productive of fingerprint evidence. By use of the complete apparatus, all sizes of such objects normally encountered are capable of being suspended over a surface sturdy enough to permit the application of the requisite pressure on latent print tape necessary to remove the print.

In addition, the apparatus is adequately small and portable that it may be taken directly along to the site of the crime in the criminology kit so that the prints may be removed on site, eliminating the often used current procedure of tagging these objects and taking them to a central processing lab with the further complication of that procedure, not to mention the additional risk of losing the prints. Also, a technician working on his own is now quite capable of lifting prints without the need of an associate, which not only saves labor but eliminates the loss of prints through attempts to remove them single handedly without waiting for additional help.

I claim:

1. An evidence gripping jig apparatus for temporarily supporting objects of evidence for fingerprint removal, said jig apparatus comprising:
   (a) a straight cylindrical shaft having a guide member at one end defining at least three generally longitudinal apertures, said shaft having a threaded portion at the region adjacent said guide member;
   (b) a plurality of generally rigid expansible arms each passing through a respective one of said apertures in loose sliding relationship and having a gripper foot on the outer end thereof;
   (c) a junction collar threadedly engaged on the threaded portion of said shaft and pivotally engaging the inner ends of said arms such that advancement or retreat of said collar on said shaft caused by the relative rotation therebetween causes the outer ends of said arms to expand or contract;
   (d) said arms, apertures and collar being relatively spaced and dimensioned to permit expansion of said arms outward beyond an angle of 45° relative to the axis of said shaft to permit wide-angle gripping of objects having large interior diameters; and
   (e) a base having a socket defining at an incline an angle between the horizontal and the vertical and being dimensioned to seat the other end of said shaft therein to temporarily support same and an object to be fingerprinted engaged thereby, at an oblique angle to permit easy access to the sides thereof for fingerprint removal.

2. A gripping jig apparatus according to claim 1 wherein said shaft has a torque disk mounted thereon spaced from the other end of said shaft to permit alternative high speed twirling or high torque twisting of said shaft, and providing enough of the end of said shaft exposed to seat in said socket.

3. Structure according to claim 1 wherein said base is comprised of a generally planar panel having said socket integral therewith and extending from adjacent one side of said panel upward at an angle and generally toward the center of said panel such that a jig assembly supported in said socket is situated over said panel.

* * * * *